United States Patent
Di Ronza et al.

(10) Patent No.: US 11,242,447 B2
(45) Date of Patent: Feb. 8, 2022

(54) HIGH RIGIDITY COMPOUND FOR PNEUMATIC TYRES COMPRISING FUNCTIONALIZED LIGNIN

(71) Applicant: BRIDGESTONE CORPORATION, Tokyo (JP)

(72) Inventors: Raffaele Di Ronza, Rome (IT); Ludovica Caliano, Rome (IT); Claudia Aurisicchio, Rome (IT)

(73) Assignee: BRIDGESTONE CORPORATION, Tokyo (JP)

(*) Notice: Subject to any disclaimer, the term of this patent is extended or adjusted under 35 U.S.C. 154(b) by 82 days.

(21) Appl. No.: 16/463,090

(22) PCT Filed: Nov. 24, 2017

(86) PCT No.: PCT/EP2017/080375
§ 371 (c)(1),
(2) Date: May 22, 2019

(87) PCT Pub. No.: WO2018/099822
PCT Pub. Date: Jun. 7, 2018

(65) Prior Publication Data
US 2019/0284372 A1    Sep. 19, 2019

(30) Foreign Application Priority Data

Nov. 29, 2016  (IT) .................. 102016000120857

(51) Int. Cl.
*C08L 7/00*  (2006.01)
*B60C 1/00*  (2006.01)

(52) U.S. Cl.
CPC .............. *C08L 7/00* (2013.01); *B60C 1/00* (2013.01); *B60C 2001/005* (2013.01); *B60C 2001/0058* (2013.01); *C08L 2205/03* (2013.01)

(58) Field of Classification Search
None
See application file for complete search history.

(56) References Cited

U.S. PATENT DOCUMENTS 5,066,721 A * 11/1991 Hamada ............. B60C 1/0016
                                              525/102
2010/0204368 A1 * 8/2010 Benko ...................... C08H 6/00
                                              524/73

FOREIGN PATENT DOCUMENTS

WO    2014/097108 A1    6/2014

OTHER PUBLICATIONS

Mingcun Wang et al., "Lignin Functionalized by Thermally Curable Propargyl Groups as Heat-Resistant Polymeric Material", Journal of Polymers and the Environment, Apr. 18, 2012, pp. 783-787, vol. 20, No. 3.
International Search Report for PCT/EP2017/080375 dated Mar. 27, 2018 [PCT/ISA/210].

* cited by examiner

*Primary Examiner* — Arrie L Reuther
(74) *Attorney, Agent, or Firm* — Sughrue Mion, PLLC

(57) ABSTRACT

A rubber compound for making a pneumatic tyre structural component comprising a cross-linkable unsaturated-chain polymer base, a reinforcing filler, a thermosetting resin and a vulcanization system. The thermosetting resin comprises functionalized lignin with —OR groups wherein R is an alkyne group with a number of carbon atoms of between (3) and (18).

6 Claims, No Drawings

HIGH RIGIDITY COMPOUND FOR PNEUMATIC TYRES COMPRISING FUNCTIONALIZED LIGNIN

CROSS REFERENCE TO RELATED APPLICATIONS

This application is a National Stage of International Application No. PCT/EP2017/080375 filed Nov. 24, 2017, claiming priority based on Italian Patent Application No. 102016000120857 filed Nov. 29, 2016.

The present invention relates to the use of appropriately functionalized lignin in high rigidity compounds for pneumatic tyres.

In particular the present invention relates to a compound for the "bead" as a structural component of the pneumatic tyre.

Here and hereinafter the term "methylene acceptor" resin means a resin capable of cross-linking by means of methylene bridges in the presence of a "methylene donor" compound.

Here and hereinafter "non-productive blending step" means a blending step wherein to the cross-linkable unsaturated chain polymer base are added and blended the ingredients of the compound with the exception of the vulcanization system; while "productive blending step" means a blending step wherein the vulcanization system is added and blended to the compound under preparation.

As is known, compounds for the preparation of a structural component, referred to with the English wording "BEAD FILLER", must, for obvious functional reasons, have high rigidity. Among those compounds that are commonly used to obtain such a rigidity are carbon black belonging to the N330 series and a bi-component thermosetting resin, which is made by means of a cross-linking reaction involving methylene bridges.

Specifically, the bi-component resin is made by means of a cross-linking reaction between a methylene acceptor compound and a methylene donor compound.

In order to avoid that the above-mentioned cross-linking reaction takes place during the compound preparation step, with the obvious processability problems that this would entail, the methyl acceptor compound is usually added to the compound during the first non-productive blending step, while the methylene donor compound is added to the compound only during the productive blending step wherein the temperature is such that it does not help the cross-linking thereof.

This solution, although commonly used, nevertheless results in a non-optimal formation of the bi-component resin. One such disadvantage arises from the fact that the two thermosetting resin components must be added during two separate blending steps.

The inventors of the present invention have found that it is possible to replace the bi-component resin with an appropriately functionalized lignin, thus obtaining better results.

Lignin is an organic substance that binds the cells and fibers that constitute wood and the lignified elements of plants. After cellulose, it is the most abundant renewable source of carbon on earth. Although it is not possible to define the precise structure of lignin as a chemical molecule, it is however possible to identify lignin as a polymeric structure based on the following three phenylpropane units: -p-coumaryl alcohol; -coniferyl alcohol (4-hydroxy-3-methoxycinnamyl alcohol); -sinapyl alcohol (4-hydroxy-3,5-dimethoxycinnamyl alcohol). As can easily be inferred from the chemical structure of the basic components of lignin, the latter is particularly rich in hydroxyl groups—mainly of the phenolic, alcohol or carboxylic type—that render the lignin itself particularly suitable for functionalization by means of esterification and/or etherification reactions.

There are several lignin extraction processes, including the Kraft process and the process of Sulfonation.

Kraft Lignin is a byproduct of the Kraft process that is used to chemically extract cellulose from wood. It is obtained by means of precipitation, lowering the pH of the quenched liquor from the Kraft process. The phenolic, alcohol, and carboxylic hydroxyls are the main identifiable functional groups in Kraft lignin, while thiol groups are present to a lesser extent.

By contrast the Sulfonation process contributes to obtaining a lignin characterized by the presence of high concentrations of sulfonic groups.

As it may immediately seem to a person skilled in the art, the use of lignin to replace a thermosetting resin represents a significant advantage in terms of sustainability. In fact, lignin is a natural product obtained from paper industry waste products. In this respect, it should also be specified that the disposal of lignin is a limiting step within the paper production chain.

The object of the present invention is a rubber compound for making a pneumatic tyre structural component comprising a cross-linkable unsaturated-chain polymer, a reinforcing filler, a thermosetting resin and a vulcanization system; said compound being characterized in that said thermosetting resin comprises functionalized lignin with —OR groups wherein R is an alkyne group with a number of carbon atoms between 3 and 18.

Here and hereinafter, by vulcanization system is meant a complex of ingredients comprising at least sulfur and accelerator compounds, that in the preparation of the compound are added in a final mixing step, and have the purpose of promoting the vulcanization of the polymer base once the compound is subjected to a vulcanization temperature.

Here and hereinafter, the term "cross-linkable unsaturated-chain polymer base" refers to any natural or synthetic non-cross-linked polymer capable of assuming all of the chemical-physical and mechanical characteristics typically assumed by elastomers after cross-linking (vulcanization) with sulfur-based systems.

Preferably, said functionalized lignin is added to the compound under preparation during the productive blending step.

Preferably, said —OR groups derive from the functionalization from 5 to 100% of the lignin phenolic hydroxyl groups.

Preferably, R is —CH$_2$CCH.

Preferably, said compound comprises from 5 to 15 phr of said functionalized lignin.

Preferably, said functionalized lignin is derived from Kraft lignin.

A further object of the present invention is a pneumatic tyre structural component made with the compound according to the present invention. Preferably, said structural component is a BEAD FILLER.

A still further object of the present invention is a pneumatic tyre comprising a structural component made with the compound according to the present invention.

A still further object of the present invention is the use of functionalized lignin as a thermosetting resin in rubber compounds for the preparation of a pneumatic tyre structural element; said functionalized lignin comprising —OR groups wherein R is an alkyne group with a number of carbon atoms between 3 and 18.

For a better understanding of the invention, the following examples are given for illustrative and non-limiting purposes.

EXAMPLES

Four compounds were prepared of which: the first (Compound A) represents a first comparison example and refers to a prior art compound wherein the methylene acceptor compound is added during the first non-productive blending step and the methylene donor compound is added during the productive blending step; the second (Compound B) represents another comparison example, wherein both the methylene acceptor compound and the methylene donor compound are added during the productive blending step; the third (Compound C) represents a still further comparison example, wherein instead of the bi-component resin represented by the methylene acceptor compound and by the methylene donor compound, non-functionalized lignin was used; the fourth (Compound D) represents an example of the invention wherein instead of the bi-component resin, represented by the methylene acceptor compound and by the methylene donor compound, the functionalized lignin according to the invention was used.

The example compounds were prepared according to the procedure reported below.

Preparation of the Compounds (1$^{st}$ Non-Productive Blending Step)

Before the start of the mixing, a closed chamber mixer with an internal volume of between 230 and 270 liters was loaded with ingredients listed in Table I, thus reaching a fill factor of between 66-72%.

The mixer was operated at a speed of between 40-60 rpm, and the mixture thus formed was discharged once a temperature of between 140-160° C. had been reached.

(2$^{nd}$ Non-Productive Blending Step)

The mixture from the previous step was reworked in the mixer operating at a speed of 40-60 rpm and subsequently removed once a temperature of 130-150° C. had been reached.

(Productive Blending Step)

The ingredients listed in Table I were added to the mixture obtained from the previous step, reaching a filling factor of between 63-67%.

The mixer was operated at a speed of between 20-40 rpm, and the mixture thus formed was discharged once a temperature of between 100-110° C. had been reached.

Table I reports the compositions in phr of the five comparison compounds and of the compound of the invention.

TABLE I

| | A | B | C | D |
|---|---|---|---|---|
| 1$^{st}$ non-productive blending step | | | | |
| NR | 75 | | | |
| SBR | 25 | | | |
| CB | 70 | | | |
| PF Resin | 10 | — | — | — |
| ZnO | 6 | | | |
| Stearic acid | 2 | | | |
| TMQ | 1.5 | | | |
| 6PPD | 0.5 | | | |

TABLE I-continued

| | A | B | C | D |
|---|---|---|---|---|
| productive blending step | | | | |
| PF Resin | — | 10 | — | — |
| HMMM | 3 | 3 | — | — |
| Lignin | — | — | 10 | — |
| Functionalized lignin | — | — | — | 10 |
| Sulfur | 8 | | | |
| TBBS | 2 | | | |

NR is a 1,4-cis polyisoprene rubber of natural origin.

SBR is a styrene-butadiene rubber in solution with an average molecular weight comprising, respectively, of between 500-1500×10$^3$; a styrene content of between 10 and 45%, a vinyl content of between 20 and 70% and an oil content of between 0 and 30%.

CB is carbon black belonging to the class N330

PF resin stands for phenol-formaldehyde resin and constitutes the methylene acceptor compound.

TMQ and 6PPD respectively stand for poly(1,2-dihydro-2,2,4-trimethylquinoline) and N-1,3-dimethylbutyl-N'-phenyl-paraphenylenediamine and constitute two antioxidant agents.

HMMM stands for hexamethoxymethylamine and constitutes the methylene donor compound.

TBBS stands for N-tert-butyl-2-benzothiazyl sulfenamide and constitutes a vulcanization accelerator.

The non-functionalized lignin used is marketed by Sigma Aldrich under the trade name of Alkali Lignin.

The following is an illustrative and non-limiting exemplary embodiment of functionalized lignin according to the invention.

The lignin sample is solubilized in dimethylformamide solution containing a concentration of potassium carbonate that is calculated based upon the content of phenolic hydroxyl and carboxylic acids. The solution is heated to 50° C. and reacted for about 4 hours with the necessary quantity of propargyl Bromide in order to obtain the required functionalization level.

After cooling the solution was precipitated by means of acidification and the solid residue was washed and centrifuged before being recovered.

Each of the compounds reported in Table I was subjected to a series of tests in order to evaluate the viscosity thereof and the dynamic-mechanical properties thereof.

In particular, the measurement of viscosity was performed according to the ASTM D1646 standard, the rheometric properties were measured according to the ASTM D6204 standard, the dynamic-mechanical properties were measured according to the ISO 4664 standard.

Table II reports the results obtained from the test described above.

For more immediate evidence of the benefits relating to the compound of the present invention, the values obtained from the tests were reported in Table II in indexed form against the results obtained from the comparison Compound A.

TABLE II

| | A | B | C | D |
|---|---|---|---|---|
| Viscosity | 100 | 100 | 98 | 105 |
| T50 | 100 | 99 | 100 | 97 |
| E'1% | 100 | 99 | 90 | 115 |
| tanD1% | 100 | 103 | 110 | 95 |

From the values reported in Table II, it is evident that the use of functionalized lignin ensures a better balance between rigidity and hysteresis.

Greater compound rigidity signifies greater BEAD FILLER functionality, while lower hysteresis ensures good resistance to repeated deformation cycles as well as a positive contribution to rolling resistance.

The viscosity and t50 values demonstrate how the use of functionalized lignin does not produce substantial variations in processability.

Finally, the comparison of the results obtained using non-functionalized lignin highlights how the latter is incapable of guaranteeing the rigidity required for the correct function of the Bead Filler.

The invention claimed is:

1. A rubber compound for making a pneumatic tyre structural component comprising a cross-linkable unsaturated-chain polymer, a reinforcing filler, a thermosetting resin and a vulcanization system; said compound being characterized in that said thermosetting resin comprises functionalized lignin with —OR groups wherein R is —CH$_2$CCH, said functionalized lignin is added to the rubber compound during a productive blending step, and said —OR groups derive from the functionalization of 5 to 100% of the hydroxyl phenolic groups of lignin, wherein the pneumatic tyre structural component is a BEAD FILLER.

2. The rubber compound according to claim 1, characterized in that it comprises from 5 to 15 phr of said functionalized lignin.

3. The rubber compound according to claim 1, characterized in that said functionalized lignin derives from Kraft lignin.

4. A pneumatic tyre structural component made with a compound according to claim 1, wherein the pneumatic tyre structural component is a BEAD FILLER.

5. A pneumatic tyre characterized in that it comprises a structural component according to claim 4.

6. A rubber compound for making a pneumatic tyre BEAD FILLER comprising a cross-linkable unsaturated-chain polymer, a reinforcing filler, a thermosetting resin and a vulcanization system; said compound being characterized in that said thermosetting resin comprises functionalized lignin with —OR groups wherein R is —CH$_2$CCH, the reinforcing filler is carbon black, said —OR groups derive from the functionalization of 5 to 100% of the hydroxyl phenolic groups of lignin, said functionalized lignin derives from Kraft lignin, said rubber compound comprises from 5 to 15 phr of said functionalized lignin, and said functionalized lignin is added to the rubber compound in the preparation of a productive blending step.

* * * * *